(12) United States Patent
Islam

(10) Patent No.: US 9,874,703 B2
(45) Date of Patent: Jan. 23, 2018

(54) FIBER OPTICAL CABLE ASSEMBLY WITH SEALED COUPLING MECHANISM

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/718,996

(22) Filed: May 21, 2015

(65) Prior Publication Data

US 2015/0338584 A1 Nov. 26, 2015

Related U.S. Application Data

(60) Provisional application No. 62/001,389, filed on May 21, 2014.

(51) Int. Cl.
G02B 6/36 (2006.01)
G02B 6/38 (2006.01)
H01R 13/52 (2006.01)
H01R 13/502 (2006.01)
H01R 13/625 (2006.01)
H01R 13/74 (2006.01)
G02B 6/44 (2006.01)

(52) U.S. Cl.
CPC ......... *G02B 6/3897* (2013.01); *G02B 6/3849* (2013.01); *H01R 13/5205* (2013.01); *G02B 6/3879* (2013.01); *G02B 6/4471* (2013.01); *H01R 13/502* (2013.01); *H01R 13/5202* (2013.01); *H01R 13/5219* (2013.01); *H01R 13/625* (2013.01); *H01R 13/748* (2013.01)

(58) Field of Classification Search
USPC ...................................... 385/78, 84
See application file for complete search history.

(56) References Cited

U.S. PATENT DOCUMENTS

| 4,915,470 | A | * | 4/1990 | Moore | G02B 6/4292 257/98 |
|---|---|---|---|---|---|
| 6,872,705 | B2 | * | 3/2005 | Lyons | A61K 38/1703 514/2.3 |
| 8,556,520 | B2 | | 10/2013 | Elenbaas et al. | |
| 8,672,705 | B2 | | 3/2014 | Schneider | |
| 8,735,722 | B2 | | 5/2014 | Scholten et al. | |
| 2006/0035509 | A1 | | 2/2006 | O'Connor | |
| 2007/0025665 | A1 | * | 2/2007 | Dean, Jr. | G02B 6/3851 385/78 |

(Continued)

*Primary Examiner* — Eric Wong
(74) *Attorney, Agent, or Firm* — Myers Bigel, P.A.

(57) ABSTRACT

A sealing enclosure for a connector on a terminated end of a cable includes an inner housing and an outer housing. In a first embodiment, the inner housing is permanently affixed and sealed to a section of the cable adjacent to the connector. The outer housing slides over the inner housing and has attachment features at a forward end of the outer housing for attaching to an enclosure surrounding a port for the connector. In a second embodiment, the outer housing has a sealing member attached to an inner circumference thereof, wherein when the outer housing is slid forward along the inner housing, the sealing member engages an outer surface of the inner housing to seal the outer housing to the inner housing.

20 Claims, 7 Drawing Sheets

(56) References Cited

U.S. PATENT DOCUMENTS

| | | | |
|---|---|---|---|
| 2012/0099822 A1* | 4/2012 | Kuffel | G02B 6/383 |
| | | | 385/78 |
| 2012/0285741 A1* | 11/2012 | Scholten | H02G 15/007 |
| | | | 174/77 R |
| 2013/0084747 A1* | 4/2013 | Dendas | H01R 13/516 |
| | | | 439/607.41 |
| 2014/0037253 A1 | 2/2014 | Elenbaas et al. | |
| 2014/0154914 A1 | 6/2014 | Schneider | |
| 2014/0226937 A1 | 8/2014 | Elenbaas et al. | |
| 2014/0308835 A1 | 10/2014 | Scholten et al. | |

* cited by examiner

FIBER OPTICAL CABLE ASSEMBLY WITH SEALED COUPLING MECHANISM

This application claims the benefit of U.S. Provisional Application No. 62/001,389, filed May 21, 2014, the entire contents of which are herein incorporated by reference.

BACKGROUND OF THE INVENTION

1. Field of the Invention

The present invention relates to an environmental sealing system for use at a cable termination. More particularly, the present invention relates to an inner housing which may be affixed to a jacket of a cable, e.g., by over molding or adhesive, and relates to an outer housing which slides over the inner housing and seals to the inner housing and seals to a mounted enclosure containing a port, wherein the inner housing supports a connector for coupling with the port.

2. Description of the Related Art

Environmental sealing structures for protecting a connector on a terminated end of a cable from the outdoor elements are known in the prior art. See for example, U.S. Pat. Nos. 8,556,520 and 8,672,705 and published US Applications 2012/0285741, 2013/0084747 and 2014/0037253, each the five references being herein incorporated by reference herein.

SUMMARY OF THE INVENTION

The Applicant has appreciated a need for a connection structure and mounting system, which is simpler in design and/or less costly to manufacture. The Applicant has also appreciated a need for connection structure which is more robust and/or contains fewer parts to simplify installation and/or contains features enabling improved environmental sealing characteristics.

The Applicant has also appreciated a need for a better sealing system between an outer housing and an inner housing, wherein the outer housing slides over the inner housing. For example, a sealing system that can accommodate bindings and not become dislodged, as the outer housing is slid over the inner housing.

These and other objects and advantages are accomplished by a sealing enclosure for a connector on a terminated end of a cable, which includes an inner housing and an outer housing. In a first embodiment, the inner housing is permanently affixed and sealed to a section of a jacket of the cable adjacent to the connector, such as by over molding or adhering a portion of the inner housing to the jacket of the cable. The outer housing slides over the inner housing and has attachment features at a forward end of the outer housing for attaching to an enclosure surrounding a port for the connector. In a second embodiment, the outer housing has a sealing member attached to an inner circumference thereof, wherein when the outer housing is slid forward along the inner housing, the sealing member engages an outer surface of the inner housing to seal the outer housing to the inner housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
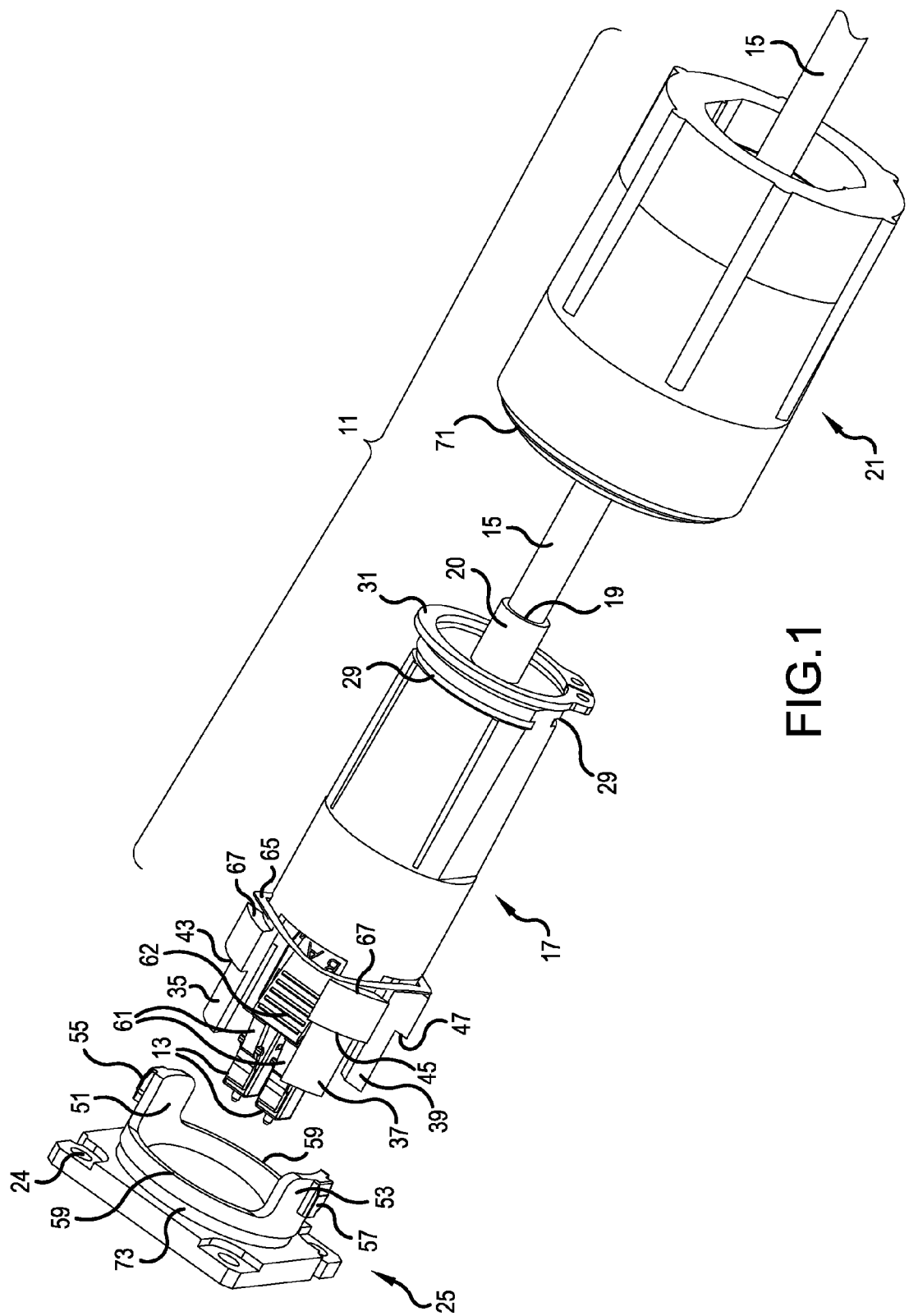
FIG. 1 is a rear perspective and exploded view of a sealing enclosure mounted to a termination end of a cable with a connector spaced from a mating enclosure, in accordance with the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 is a perspective view of a sealing enclosure 11 for a connector 13 on a cable 15. The sealing enclosure 11 includes an inner housing 17 permanently affixed to a section 19 of the cable 15 adjacent to, e.g., at least proximate to, the connector 13 at a terminated end of the cable 15. In the depicted embodiment, the connector 13 is an LC duplex connector. However, other optical or electrical connectors, such as SC, ST, LC, MPO, RJ or coaxial types, may be used in conjunction with the present invention. In preferred embodiments, the inner housing 17 is permanently affixed to the cable 15 at section 19 by over molding a strain relief 20 of the inner housing 17 onto the section 19 of the cable 15, so as to seal the inner housing 17 to the jacket of the cable 15 at section 19. In another embodiment, the strain relief 20 may be permanently affixed to the section 19 of the cable 15 by a bonding adhesive, such as epoxy.

An outer housing 21 slides over the inner housing 17. The outer housing 21 has attachment features 23 (as will be described in connection with FIGS. 5-8) at a forward end of the outer housing 21. The attachment features 23 are used to attach the outer housing 21 to a mating enclosure 25 surrounding a mating port 27 for the connector 13 of the terminated end of the cable 15. The mating port 27 is illustrated in dashed lines in FIG. 3. The mating enclosure 25 and mating port 27 are typically mounted to a board or box via screws which may pass through holes 24 and compress a gasket or O-ring 26 (see FIG. 3) between a backside of the mating enclosure 25 and an outer perimeter surface of the board or box, formed around the mating port 27.

Figure 2:
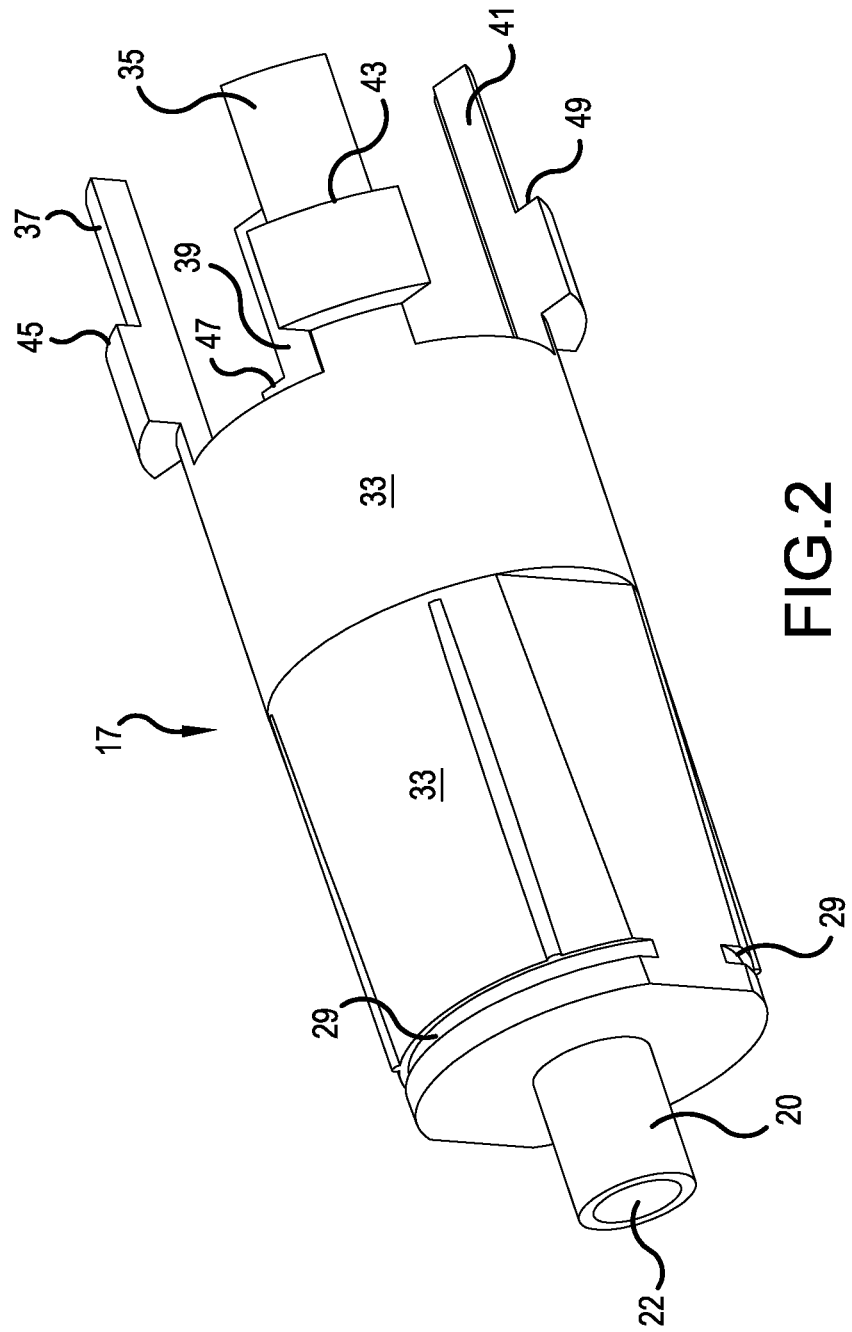
FIG. 2 is a rear perspective view of an inner housing of the sealing enclosure of FIG. 1.

FIG. 2 is a rear perspective view of the inner housing 17. The rear end of the inner housing 17 includes the strain relief 20. In a first embodiment, an inner circumferential surface 22 of the strain relief 20 is either bonded to a jacket of the cable 15, or is over molded onto the jacket of the cable 15. Alternatively, the strain relief 20 may be a shrinkable tube, e.g., a heat shrink tube. In a further embodiment, the entire inner housing 17 may be formed of one, two or more materials with a material forming the portion of the inner housing 17, constituting the strain relief 20, being a flexible material adhered, over molded or otherwise permanently attached to the jacket of the cable 15. The rear of the inner housing 17 also includes an annular groove track 29. The groove track 29 is dimensioned to retain a spring clip 31. The spring clip must be removed before the outer housing 21 can slide over the inner housing 17. Once the outer housing 21 is over the inner housing 17, the installed spring clip 31 blocks the outer housing 21 from sliding back up onto the cable 15. In other words, the outer housing 21 may slid forwards and backwards upon the inner housing 17 to a limited extent, while the spring clip 31 is installed.

The majority of the body 33 of the inner housing 17 is generally cylindrical in shape. Two flat outer surfaces may be provided one hundred eighty degrees apart on the inner housing 17, as illustrated. The flat surfaces may serve to limit rotation of the inner housing 17 within the outer housing 21 due to interference with internal features of the outer housing 21. The rotation limitation may be selected to be a value like about one sixth to one quarter of a turn, or approximately sixty degrees. At a forward end of the inner housing 17, are first, second, third and fourth guide posts 35, 37, 39 and 41, each of which extend in the forward direction. First, second, third and fourth rim stops 43, 45, 47 and 49 exist on the first, second, third and fourth guide posts 35, 37, 39 and 41, respectively. The spacing and placements of the first, second, third and fourth guide posts 35, 37, 39 and 41 and rim stops 43, 45, 47 and 49 interact with the mating enclosure 25.

Figure 3:
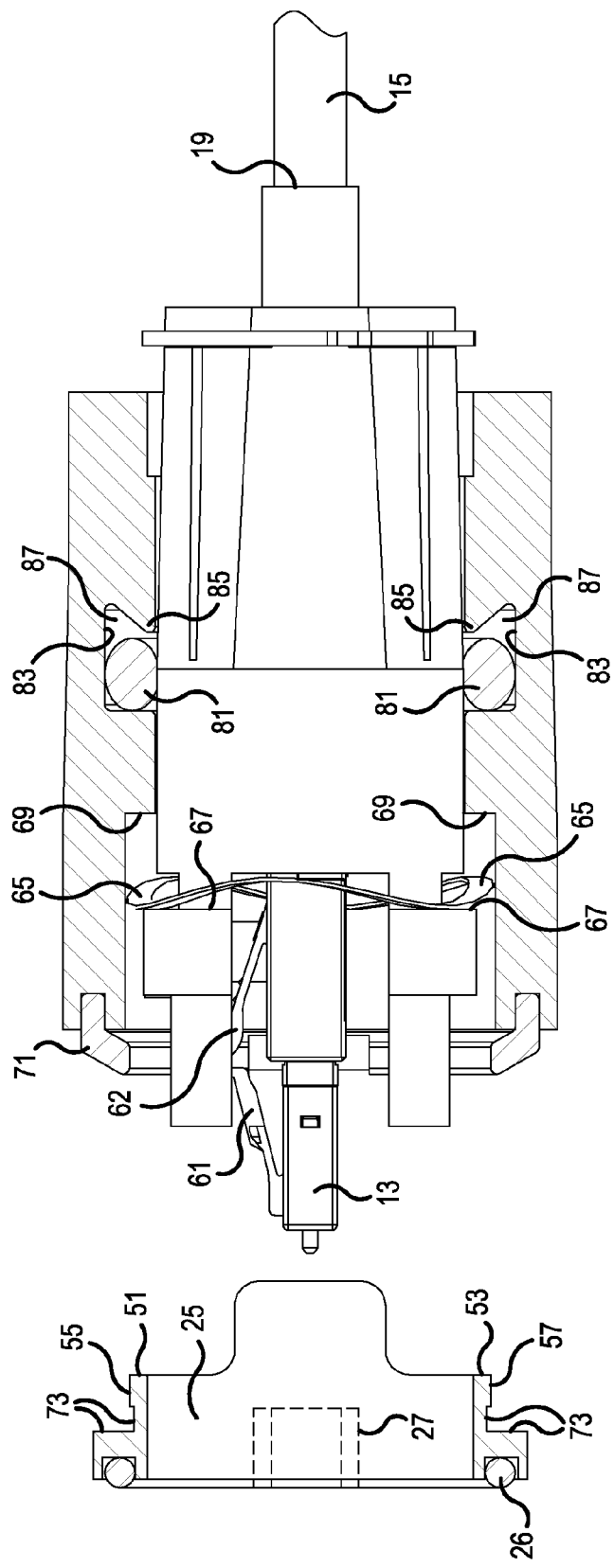
FIG. 3 is a cross sectional view an outer housing surrounding the inner housing of FIG. 2, and also showing the mating enclosure and port in cross section.
Figure 9:
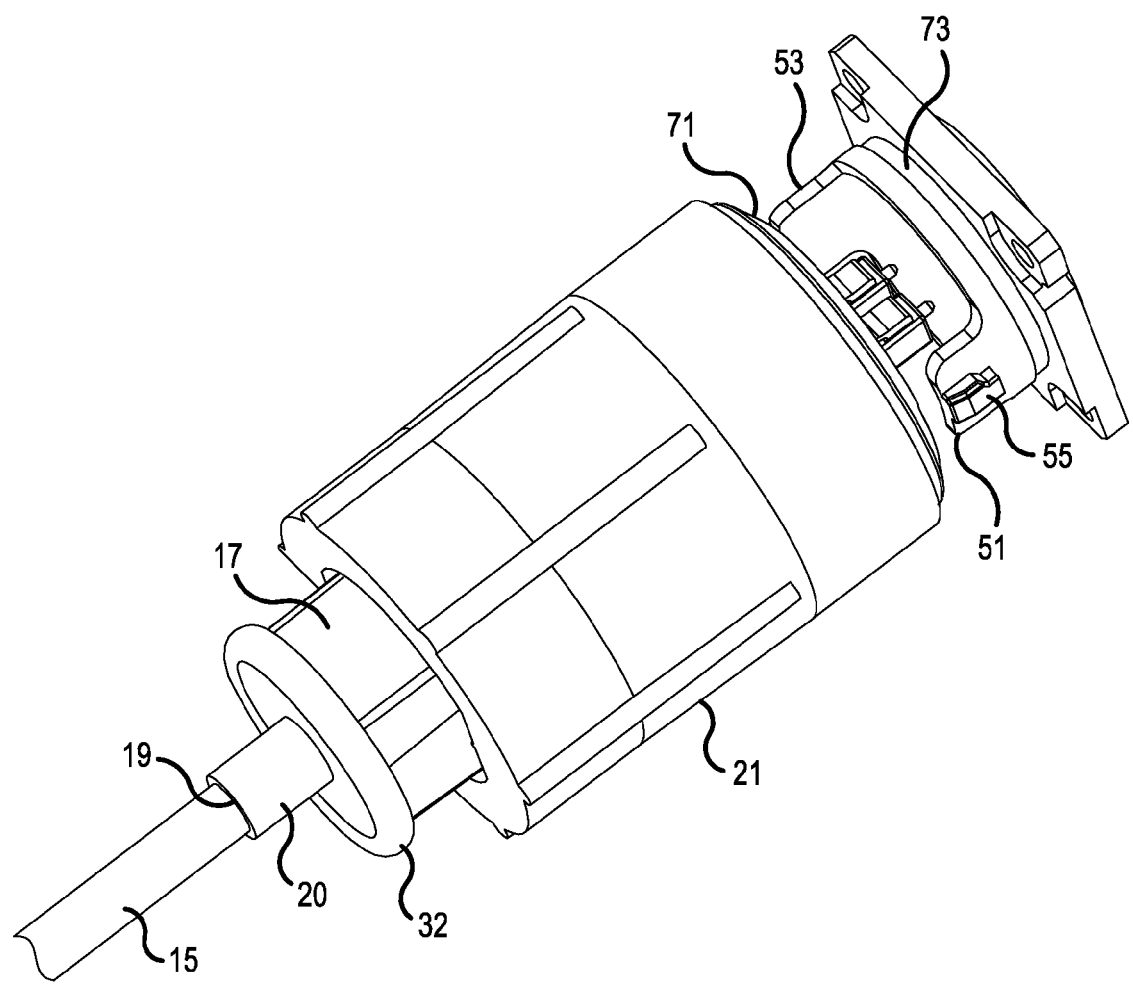
FIG. 9 is a rear perspective view of the sealing enclosure, illustrating an optional O-ring for retaining the outer housing on the inner housing.

As best seen in FIGS. 1, 3 and 9, the mating enclosure 25 includes first and second protrusions 51 and 53, with first and second locking elements 55 and 57, respectively. A rim 59 extends between the first and second protrusions 51 and 53.

Latches 61 (or a common latch trigger 62, if provided) of the connector 13 are accessible between the first and second guide posts 35 and 37, so that a user's finger may access the latches 61 or trigger 62. The spacing between the first and fourth guide posts 35 and 41 accommodates receipt of the first protrusion 51 of the mating enclosure 25. The spacing between the second and third guide posts 37 and 39 accommodates receipt of the second protrusion 53 of the mating enclosure 25. The spacing between the third and fourth guide posts 39 and 41 is not used and is optional, e.g., the third and fourth guide posts 39 and 41 may be connected as one piece. However, as illustrated in the drawings, the inner housing 17 is substantially symmetrically formed and hence may be rotated one hundred eighty degrees about its central axis and be used in either position. Such symmetry can lead to advantages, cost savings and time reduction in manufacturing and installation.

During installation, the connector 13 is mated to the mating port 27. Then, the inner housing 17 is moved forward toward the mating enclosure 27 as the first protrusion 51 seats between the first and fourth guide posts 35 and 41, and as the second protrusion 53 seats between the second and third guide posts 37 and 39. Eventually, the rim 59 of the mating enclosure 25 abuts the first, second, third and fourth rim stops 43, 45, 47 and 49 of the first, second, third and fourth guide posts 35, 37, 39 and 41, respectively.

Next, the user installs the outer housing 21 to mating enclosure 25, which secures the inner housing 17 in its abutting engagement to the mating enclosure 25. The outer housing 21 was previously slid over the cable 15. The spring clip 31 is removed, so that the outer housing 21 may slid over the inner housing 17.

As the outer housing 21 begins to reach its forward most position, a wave spring 65 is compressed between a spring stop wall 67 and a contact surface 69. The spring stop wall 67 is formed on rear faces of the first, second, third and fourth guide posts 35, 37, 39 and 41. As best seen in FIG. 3, the contact surface 69 is formed as a ridge on an inner circumferential portion of the outer housing 21.

As the outer housing 21 reaches its forward most position, a gasket 71, adhered into or over-molded to a gasket track formed in a forward edge of the outer housing 21 engages gasket contact surfaces 73 formed annularly around the mating enclosure 25, as best seen in FIGS. 1, 3 and 9. At this point, the sealing enclosure 11 is sealed to the mating enclosure 25. However, the user is maintaining the seal, and the attachment features 23 of the outer housing 21 must be engaged to the first and second locking elements 55 and 57 before the sealing enclosure is stable, and the user can release the sealing enclosure 11.

To lock the outer housing 21 to the mating enclosure 25, the first and second locking elements 55 and 57 are aligned to entrance slots 75 of the attachment features 23 and slid into the entrance slots 75. Once inside, the outer housing 21 is turned clockwise, e.g., by sixty degrees, until the first and second locking elements 55 and 57 abut ends 77. Then, the outer housing 21 is released and the wave spring 65 causes the first and second locking elements 55 and 57 to seat into recesses 79. Such an attachment system is commonly referred to as a bayonet locking system. Raised ridges (as illustrated) or knurling or recesses may be provided on the outside of the outer housing 21 to assist the frictional engagement between a user's fingers and the outer housing 21 during the rotation of the outer housing 21. Other locking systems may be used in accordance with the present invention, if desired.

In the locked position, the wave spring 65 presses against the contact surface 69 of the outer housing 21. Since the outer housing 21 is locked to the mating enclosure 25 and cannot move, the first, second, third and fourth rim stops 43, 45, 47 and 49 of the first, second, third and fourth guide posts 35, 37, 39 and 41, respectively, stay in a spring biased engagement with the rim 59 of the mating enclosure 25.

Figure 4:
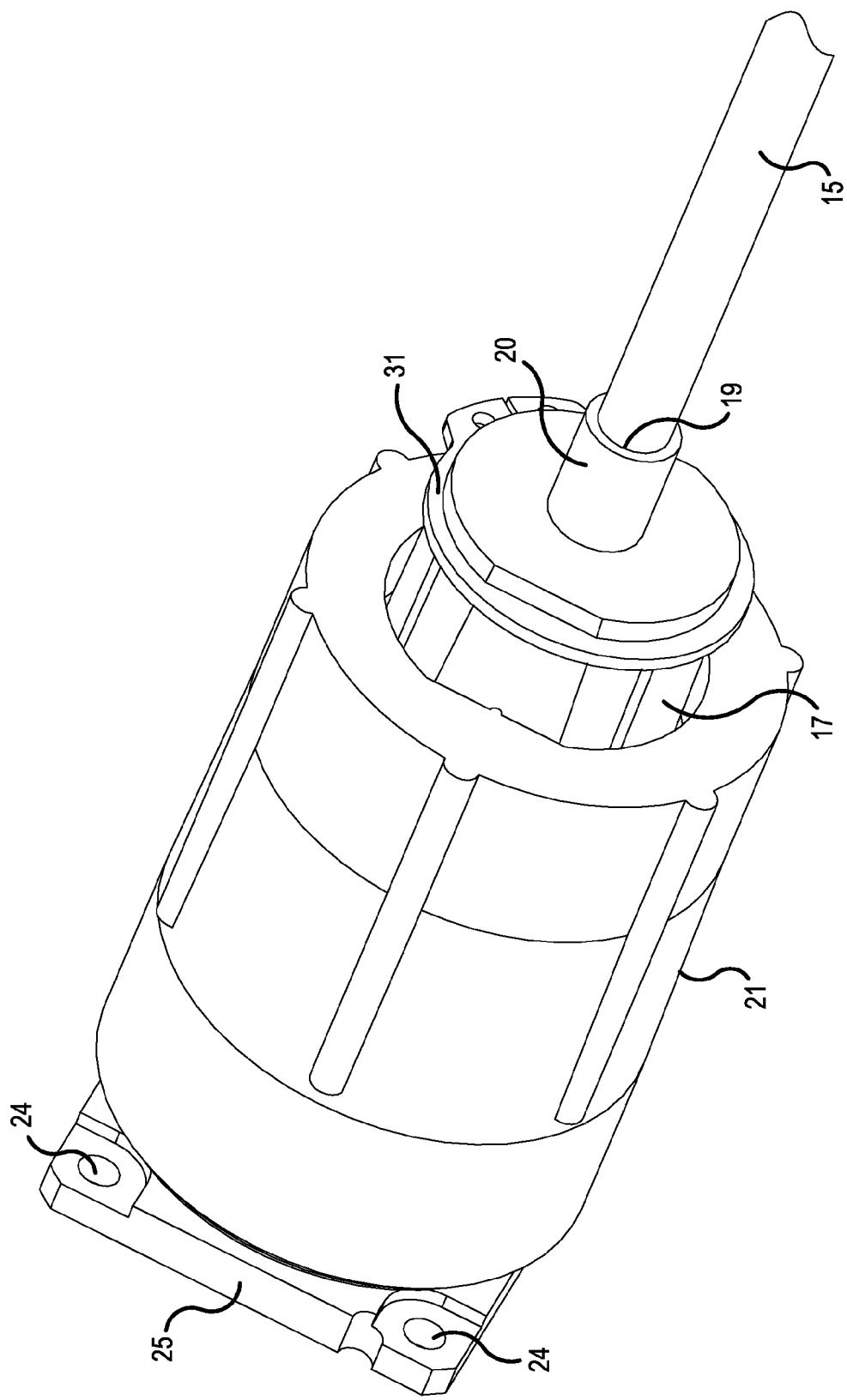
FIG. 4 is a rear perspective view of the sealing enclosure of FIG. 1 attached to the mating enclosure of FIG. 1.
Figure 5:
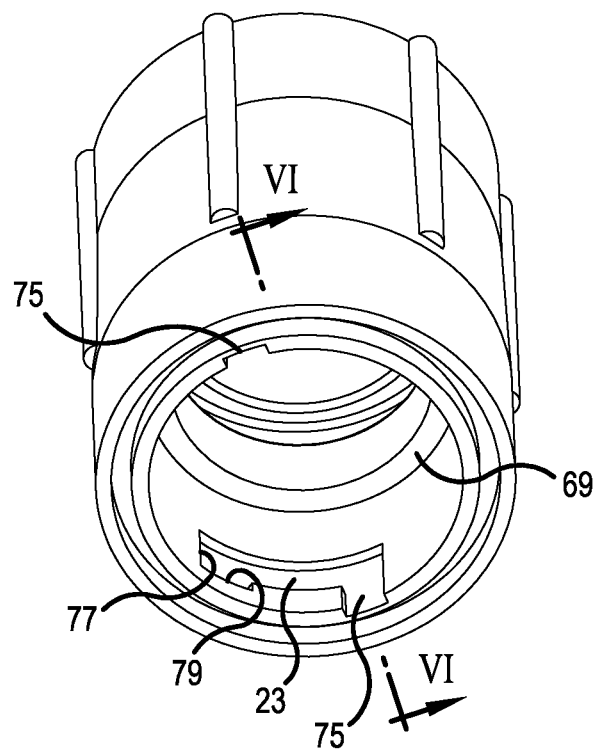
FIG. 5 is a front perspective view of the outer housing of FIG. 1.
Figure 6:
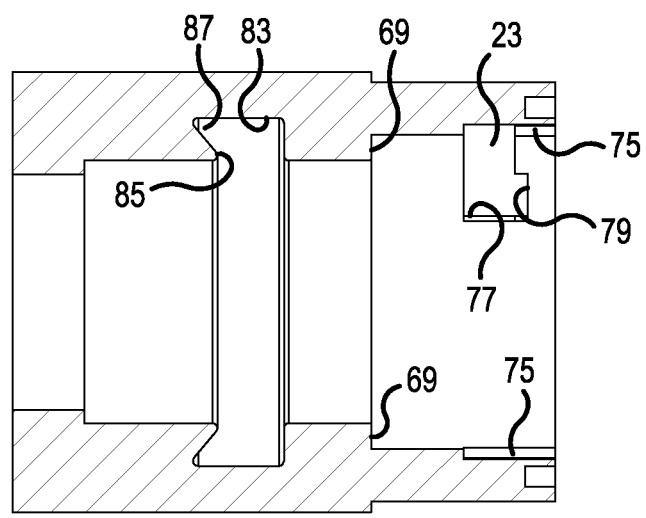
FIG. 6 is a cross sectional view taken along line VI-VI in FIG. 5.

Lastly, and as shown in FIG. 4, the spring clip 31 is installed into groove track 29. The spring clip 31 prevents the outer housing 21 from sliding back down the cable 15 away from the mating enclosure 25 when a user uninstalls the outer housing 21 from the mating enclosure 25, e.g., with a counterclockwise turn. Of course, devices other than a spring clip 31 may be used to retain the outer housing 21 in a sliding arrangement on the inner housing 17, such as an O-ring 32 installed in the groove track 19, as depicted in FIG. 9.

Figure 7:
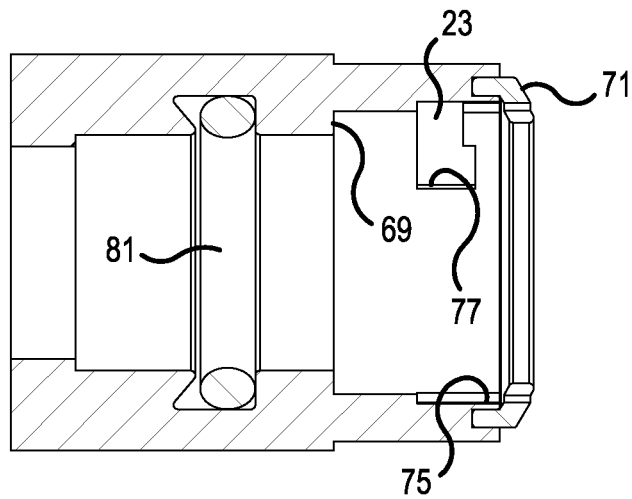
FIG. 7 is the same cross sectional view as FIG. 6, but illustrates an O-ring installed within the outer housing and a gasket installed on an outer end of the outer housing.

In a preferred embodiment of the present invention, the outer housing 21 has a sealing member attached to an inner circumference thereof. As best seen in FIGS. 3 and 7, the sealing member may be an O-ring 81. The O-ring 81 is seated into a groove 83 around the inner circumference of the outer housing 21. The groove 83 has a dovetail edge 85 leading to an offset area 87. When the outer housing 21 is slid forward along the inner housing 17, the O-ring 81 may be briefly lifted by the dovetail edge 83 into the offset area 85, so as to ease the sliding resistance and ensure that the O-ring 81 is not displaced from the groove 83 during sliding of the outer housing 21 over the inner housing 17, e.g., should the O-ring 81 bind while sliding the outer housing 21 over the inner housing 17.

The O-ring 81 is intended to engage the outer surface of the inner housing 17 to seal the outer housing 21 to the inner housing 17. To better ensure a seal between the outer housing 21 and the inner housing 17, the inner housing 17 may have a tapering diameter, such that the inner housing 17 has a slightly greater outer diameter at an end of the inner housing 17 closest to the connector 13 at the terminated end of the cable 15. Alternatively, the outer housing 21 may have a slightly tapering diameter, so that the outer housing 21 has a slightly larger inner diameter at an end of the outer housing 21 closest to the connector 13 at the terminated end of the cable 15.

Figure 8:
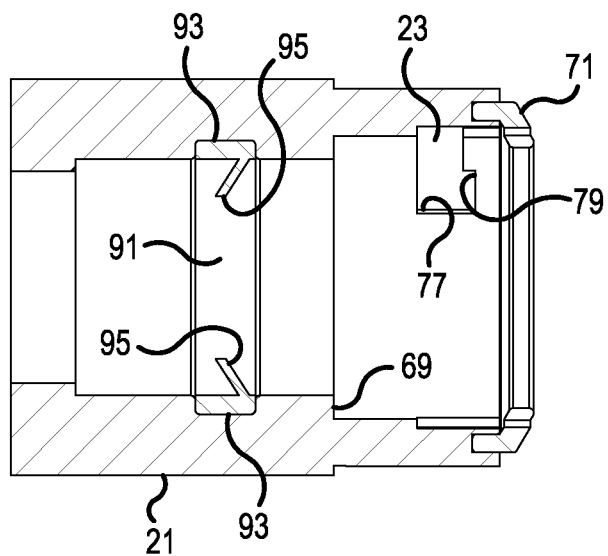
FIG. 8 is the same cross sectional view as FIG. 7, but illustrates a flapper gasket installed within the outer housing instead of the O-ring.

In an alternative embodiment of the invention depicted in FIG. 8, the O-ring 81 has been replaced by a V-shaped, flapper gasket 91. The flapper gasket 91 has a base 93 affixed to the inner circumference, e.g., the groove 83 of the outer housing 21, and an annual flap 95 extends from the base 93 and engages the outer surface of the inner housing 17. Flapper gaskets 91 with cross sectional shapes other than a V-shape are also within the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A sealing enclosure for a connector on a cable, the sealing enclosure comprising:
    an inner housing permanently affixed to a section of cable adjacent to a connector at a terminated end of the cable, wherein said inner housing comprises first and second guide posts dimensioned to receive a protrusion of an enclosure therebetween, said enclosure surrounding a port for the connector of the terminated end of the cable; and
    an outer housing which slides over said inner housing and has attachment features at a forward end of said outer housing for attaching said outer housing to a locking feature of said protrusion.

2. The enclosure of claim 1, wherein said inner housing is permanently affixed to the section of cable by over molding said inner housing onto the section of cable to seal said inner housing to the section of cable.

3. The enclosure of claim 1, wherein said inner housing is permanently affixed to the section of cable by a bonding adhesive to seal said inner housing to the section of cable.

4. The enclosure of claim 1, wherein said outer housing has a sealing member attached to an inner circumference thereof, wherein when said outer housing is slid forward along said inner housing, said sealing member engages an outer surface of said inner housing to seal said outer housing to said inner housing.

5. The enclosure of claim 4, wherein said outer housing has a groove around said inner circumference, and wherein said sealing member is an O-ring residing within said groove, and wherein said groove has a dovetail edge leading to an offset area, and wherein when said outer housing is slid forward along said inner housing said O-ring may be briefly lifted by said dovetail edge into said offset area so as to ease the sliding and ensure that said O-ring is not displaced from said groove during sliding of said outer housing over said inner housing.

6. The enclosure of claim 5, wherein said inner housing has a tapering diameter, such that said inner housing has a slightly greater diameter at an end of said inner housing closest to the connector at the terminated end of the cable.

7. The enclosure of claim 4, wherein said sealing member is a flapper gasket, having a base affixed to said inner circumference of said outer housing and an annual flap extending from said base and engaging said outer surface of said inner housing.

8. The enclosure of claim 7, wherein said base is seated into a groove formed into said outer housing around said inner circumference of said outer housing.

9. The enclosure of claim 1, further comprising: a gasket attached to or over-molded to a forward edge of said outer housing.

10. A sealing enclosure for a connector on a cable, the sealing enclosure comprising:
    an inner housing sealing to a section of cable adjacent to a connector at a terminated end of the cable, wherein said inner housing comprises first and second guides dimensioned to receive a protrusion of an enclosure therebetween, said enclosure surrounding a port for the connector of the terminated end of the cable; and
    an outer housing which slides over said inner housing and has attachment features at a forward end of said outer housing for attaching said outer housing to a locking feature of said protrusion, wherein said outer housing has a sealing member attached to an inner circumference thereof, wherein when said outer housing is slid forward along said inner housing, said sealing member engages an outer surface of said inner housing to seal said outer housing to said inner housing.

11. The enclosure of claim 10, wherein said outer housing has a groove around said inner circumference, and wherein said sealing member is an O-ring residing within said groove, and wherein said groove has a dovetail edge leading to an offset area, and wherein when said outer housing is slid forward along said inner housing said O-ring may be briefly lifted by said dovetail edge into said offset area so as to ease the sliding and ensure that said O-ring is not displaced from said groove during sliding of said outer housing over said inner housing.

12. The enclosure of claim 11, wherein said inner housing has a tapering diameter, such that said inner housing has a slightly greater diameter at an end of said inner housing closest to the connector at the terminated end of the cable.

13. The enclosure of claim 10, wherein said sealing member is a flapper gasket, having a base affixed to said inner circumference of said outer housing and an annual flap extending from said base and engaging said outer surface of said inner housing.

14. The enclosure of claim 13, wherein said base is seated into a groove formed into said outer housing around said inner circumference of said outer housing.

15. The enclosure of claim 10, further comprising: a gasket attached to or over-molded to a forward edge of said outer housing.

16. A cable termination with a sealing enclosure for a connector on a terminated end of a cable, the cable termination comprising:
    a cable with a connector on a terminated end;
    an inner housing permanently affixed and sealing to a section of said cable adjacent to said connector at said terminated end of said cable, wherein said inner housing comprises first and second guides dimensioned to receive a protrusion of an enclosure therebetween, said enclosure surrounding a port for the connector of the terminated end of the cable; and
    an outer housing which slides over said inner housing and has attachment features at a forward end of said outer housing for attaching said outer housing to a locking feature of said protrusion, wherein said outer housing has a sealing member attached to an inner circumference thereof, wherein when said outer housing is slid forward along said inner housing, said sealing member engages an outer surface of said inner housing to seal said outer housing to said inner housing.

17. The enclosure of claim 16, wherein said outer housing has a groove around said inner circumference, and wherein said sealing member is an O-ring residing within said groove, and wherein said groove has a dovetail edge leading to an offset area, and wherein when said outer housing is slid forward along said inner housing said O-ring may be briefly lifted by said dovetail edge into said offset area so as to ease the sliding and ensure that said O-ring is not displaced from said groove during sliding of said outer housing over said inner housing.

18. The enclosure of claim 17, wherein said inner housing has a tapering diameter, such that said inner housing has a slightly greater diameter at an end of said inner housing closest to said connector at said terminated end of the cable.

19. The enclosure of claim 16, wherein said sealing member is a flapper gasket, having a base affixed to said inner circumference of said outer housing and an annual flap extending from said base and engaging said outer surface of said inner housing.

20. The enclosure of claim 19, wherein said base is seated into a groove formed into said outer housing around said inner circumference of said outer housing.

* * * * *